United States Patent [19]

Bleckmann

[11] 4,369,836
[45] Jan. 25, 1983

[54] HEAT EXCHANGE ASSEMBLY

[76] Inventor: Ingo Bleckmann, Ignaz-Rieder-Kai 11, A-5020 Salzburg, Austria

[21] Appl. No.: 149,691

[22] Filed: May 14, 1980

[30] Foreign Application Priority Data

May 16, 1979 [DE] Fed. Rep. of Germany ....... 2919848

[51] Int. Cl.³ .............................................. F28F 1/32
[52] U.S. Cl. ..................................... 165/171; 165/49; 29/432; 126/447
[58] Field of Search ......................... 165/49, 53, 171; 237/69; 29/157.3 C, 157.3 D, 432; 219/345, 530, 540; 126/447, DIG. 2

[56] References Cited

U.S. PATENT DOCUMENTS

| 1,800,150 | 4/1931 | Musgrave et al. | 165/49 |
| 3,279,048 | 10/1966 | Grove et al. | 29/432 |
| 3,364,560 | 1/1968 | Roy | 29/432 |
| 3,657,518 | 4/1972 | Welsh et al. | 219/540 |
| 4,098,261 | 7/1978 | Watt | 165/171 |

FOREIGN PATENT DOCUMENTS

| 539941 | 4/1957 | Canada | 165/53 |
| 605676 | 9/1960 | Canada | 165/171 |
| 1990092 | 12/1962 | Fed. Rep. of Germany . | |
| 2536591 | 2/1977 | Fed. Rep. of Germany . | |
| 2539590 | 3/1977 | Fed. Rep. of Germany . | |
| 2702939 | 7/1978 | Fed. Rep. of Germany . | |
| 921453 | 4/1902 | France | 165/53 |
| 1459052 | 9/1965 | France | 165/49 |
| 2330974 | 6/1977 | France . | |
| 313509 | 4/1956 | Switzerland | 165/53 |

Primary Examiner—Albert W. Davis, Jr.
Assistant Examiner—Margaret A. Focarino
Attorney, Agent, or Firm—Fleit & Jacobson

[57] ABSTRACT

A heat exchange assembly such as for a solar roof comprises a pipe carried by a carrier plate and held thereto by suitable holding means. The carrier plate and/or the holding means have openings, each opening having a jagged edge portion projecting perpendicularly to the surface of the component in which it is formed. The jagged edge of each opening is partially embedded into the other component and material from that other component is engaged into the opening to form a rivet head-like configuration thereby to anchor the two components securely together.

20 Claims, 9 Drawing Figures

HEAT EXCHANGE ASSEMBLY

BACKGROUND OF THE INVENTION

Various kinds of heat exchange equipment are known, which include at least one heat exchange assembly comprising a conduit means for carrying a heat exchange fluid. The conduit means may be a pipe arrangement connected to a carrier member such as a metal plate or metal extrusion of suitable configuration, for receiving or giving off heat. The pipe arrangement may be held to the carrier member by clips or by one or more holding plate members which thus sandwich the pipe arrangement to the carrier member. Kinds of heat exchange equipment in which such assemblies are used include evaporators, in particular large-area units, solar panels, or solar roofs, i.e. a roof structure adapted to receive and utilise solar energy.

A solar roof is proposed in French patent specification No. 2 330 794 wherein, in a slightly different construction, the heat exchange medium is carried through passages provided in suitable extrusion plates or panels. However, extruded members of this kind are of relatively high weight, as well as being expensive.

In another form of solar roof, for example as shown in DOS No. 27 02 939, the pipe arrangement is laid into curves or depressions formed in a sheet metal web or flat panel, and the web or panel is braced or deformed in a direction transverse to the axis of the pipe, thereby to grip the pipe.

In yet another form of solar roof, the pipe is pressed into Ω-shaped grooves in the carrier plate.

When the assembly comprises a pipe arrangement secured to a carrier member such as a plate, the pipe may be soldered or welded to the carrier plate, or, as mentioned above, connected to the plates by means of clips. In the latter case, the clips must be secured to the plate, for example by spot welding. However, welding or soldering are, in relative terms, very expensive operations, while there is also the danger that the pipe arrangement or the sheet metal web or plate which carries the pipe arrangement may be damaged in the welding or soldering operation. Furthermore, in such constructions, in which the pipe arrangement often only lies loosely against the carrier plate there is frequently only punctiform or linear contact between the pipe and the plate, so that the heat transfer between the carrier plate and the pipe is poor.

It is therefore necessary in the previously disclosed constructions to tolerate either a low degree of heat transfer, or designs which are in relative terms very expensive.

SUMMARY OF THE INVENTION

An object of the invention is to provide a heat exchange assembly which provides for a good heat transfer between the heat exchange medium and the heat receiving or emitting portion of the system.

A further object is to provide a heat exchange assembly which is of inexpensive design while also being suitable for mass production.

A still further object of the invention is to provide a heat exchange assembly wherein a pipe or pipes for carrying a heat exchange medium is or are firmly but simply connected to a carrier member.

These and other objects are achieved by a heat exchange assembly for use for example in a solar roof, a large-area evaporator or other form of heat exchange arrangement, wherein a pipe or pipes for carrying a heat exchange medium is or are connected to a carrier member which may be in the form of a metal plate or an extrusion, by holding means in the form of one or more clips or auxiliary holding plates. The carrier member and/or the clips or holding plates are provided with through openings whose edges project substantially normal to the surface of the carrier member and are of a frayed, jagged or ragged configuration, herein referred to for brevity as jagged. The jagged edges of the openings are pressed into the co-operating component, that is to say, when the openings are formed in the carrier member, then the edges of the openings are pressed into the clips or holding plates, and vice-versa. The holes are thereby filled with an anchoring portion of rivet-head-like configuration, caused by material of the above-mentioned co-operating component flowing into the opening.

Where the pipe or pipes extend in a meander configuration or have at least a plurality of portions which extend generally parallel to each other, the openings may be formed in rows between the generally parallel-extending pipe portions. The carrier member and/or the clips and/or the holding plates may have curved portions forming recesses into which the pipe or pipes fit, thereby being even more securely located in position.

The carrier member or plate may have a bent edge portion forming a connecting flange with a plurality of the above-mentioned openings therein, for securing the carrier member to a respective adjacent carrier member to be secured thereto to form a larger heat exchange assembly. It is possible for the components which have the openings to be harder, for example of a harder material, than the other components co-operating therewith. For example, the carrier member or plate, or the clips or holding plates may comprise aluminium, an aluminium alloy, copper or a copper alloy, any component of such material therefore not generally having openings but the openings instead being provided in the other component which is co-operable therewith.

The carrier member or plate is therefore connected to the clips or auxiliary holding plates for holding the pipe in place by means of the above-mentioned openings with jagged edges. It will be appreciated that it is not simply a matter of punching out holes in order to produce the above-mentioned openings. On the contrary, holes are pierced or punched in the material of the component in such a way that no material is lost, whereby the material which is displaced in order to form the hole also forms frayed or jagged edges which project from the surface of the component substantially perpendicularly thereto. When a component with openings of this kind is pressed on to another component, the jagged edges around the openings press into the other component. As the above-mentioned edges press into the material of the other component, they cause the material to be displaced and urged towards the centre of the opening so that the displaced material forms an anchoring means of rivet head-like configuration in the opening. The openings may be economically produced by needling rollers, that is to say, rollers bearing a multiplicity of needles which, when the roller is rolled over the surface of the component in which the openings are to be formed, punch through the material of that component and thereby form the holes with jagged edges.

DESCRIPTION OF THE PREFERRED EMBODIMENTS

Figure 1:
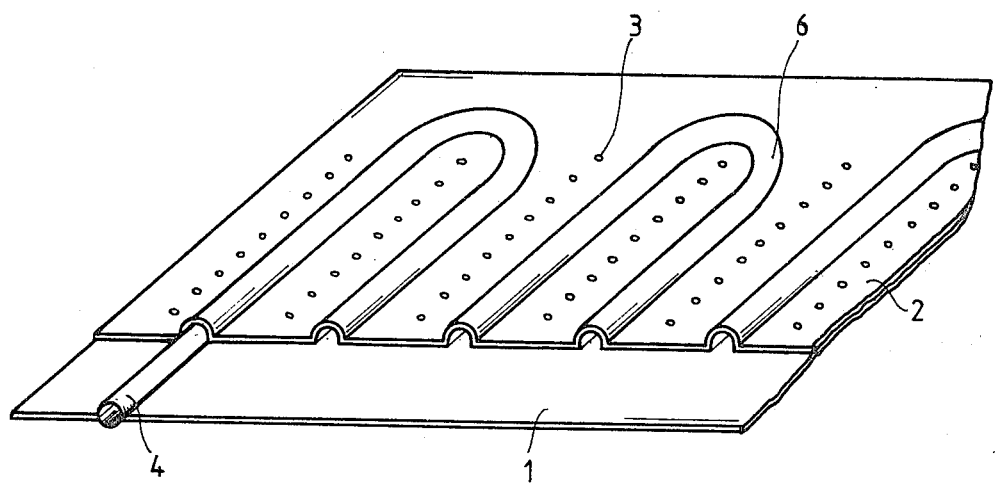
FIG. 1 shows a perspective view of a heat exchange assembly in accordance with the invention.

Reference will first be made to FIG. 1 which shows a heat exchange assembly comprising a carrier member in the form of a sheet metal web portion or plate 1 and an auxiliary holding plate 2. One or more rows of openings 3 is formed in at least one of the plates 1 or 2, for the purposes of connecting the two plates 1 and 2 together. The openings 3, as referred to hereinbefore, have frayed or ragged or jagged edges which project at least substantially perpendicularly from the surface of the plate in which they are formed, for purposes which will become clear hereinafter.

To assemble the assembly shown in FIG. 1, a pipe 4 is laid into curved recesses or depressions 6 formed in the plate 2. The two plates 1 and 2 are then pressed together with the pipe 4 therebetween, thus resulting in a long-lasting and permanent 'cold-made connection' between the two plates. Similar depressions to 6 may be formed in the plate 1, alternatively or in addition.

Figure 6:
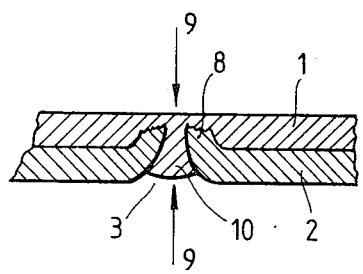
FIG. 6 shows a view on an enlarged scale of the ringed part of the construction shown in FIG. 5.

Reference should be made at this point to FIG. 6 which shows on a larger scale the effect of the jagged edges of the openings 3 when the two plates 1 and 2 are pressed together. It will be appreciated that the openings 3 are made not just by punching or stamping out holes, which implies that at least a substantial part of the material which lay within the outline of the respective hole is lost by virtue of the punching or stamping operation. On the contrary, the opening 3 shown in FIG. 6 is produced by piercing or stabbing holes in such a way that the edge portion 8 thereof is torn upwardly (as viewed in FIG. 6), thereby forming jags or ragged edges which project at least approximately perpendicularly from the adjacent surface of the plate (this being the plate 2 as shown in FIG. 6). When now the jagged portions 8 engage into the material of the plate 1 when the plates 1 and 2 are pressed together, the jagged portions 8 displace and urge the material of the plate 1 towards the central part of the opening 3; under the effect of the pressing force applied in the direction indicated by arrows 9, the material of the plate 1 which has thus been caused to flow into the opening 3 is formed into a rivet head-like configuration 10 which provides a strong anchoring action.

The pressing operation may be performed in a stationary press or by means of a moving tool or in a roller press through which the plates 1 and 2 are passed. By arranging for the press dies or pressing members to be of a suitable configuration, or by a suitable arrangement of the rollers which engage the plates 1 and 2 to press them together, it is possible to provide that the pressing force acts only on the rows of openings 3. This has the advantage therefore that, when producing the assembly, neither the raised portions 6 formed by the pipe or pipes 4 lying in the corresponding recesses in one or both of the plates 1 and 2, nor the pipe 4 itself, are deformed in such a way that the flow of heat exchange medium through the pipe arrangement 4 would be prevented or restricted. On the other hand, it is desirable for the cross-sectional area of the raised portions 6 to be somewhat less than the cross-sectional area of the pipe 4, or, in other words, for the raised portions 6 to be approximately of semicircular cross-section, as shown in FIG. 1. The effect of this is that, when the plate 2 is pressed on to the plate 1, the pipe 4 is slightly deformed, thereby forming a corresponding close-contact surface by way of which the pipe is pressed against the plate 1; in addition, a corresponding tensile stress is produced in the plate 1 between the rows of openings 3, the tensile stress causing the raised portions 6 to be pressed smoothly and firmly against the surface of the pipe 4. This results in a uniformly good degree of heat transfer between the plate 1 or the plate 2 and the surface of the pipe 4 and accordingly the heat exchange medium which circulates within the pipe 4.

The openings 3 are preferably of a diameter, in consideration of the thickness of the plate 1, such that the ragged or jagged edges 8 which are pressed out of the plane of the plate 1 are somewhat less in height than the thickness of the plate 1, as clearly visible in FIG. 6. This ensures that the surface of the plate 1 remains unchanged and generally undeformed outside of the openings 3. However, even if the diameter of the openings 3 is made somewhat larger so as to result in correspondingly ragged or jagged edge portions 8 of greater height, which could also have the result of deforming the plate in the region around each opening, practical use has shown that the tips of the jagged portions 8 are pressed flat in the pressing operation, in other words, even if the jagged portions 8 project to a substantial height above the surface in which they are formed, they are reduced to a satisfactory height of projection by the pressing force, and any deformation of the plate around each opening also tends to be removed by the pressure. Although it can then be seen, on the surface of the plate 1 which is remote from the plate 2, that a machining or processing operation has been effected, that surface of the plate is still continuous and generally undamaged.

Figure 2:
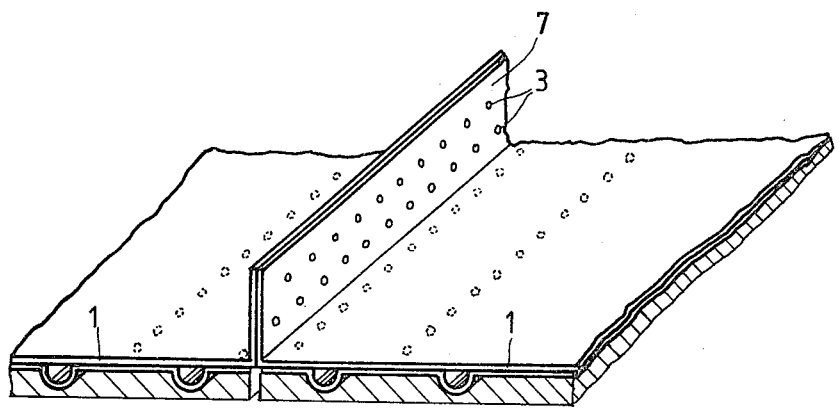
FIG. 2 shows a view in cross-section through a connection between two heat exchange assemblies as shown in FIG. 1.

Reference will now be made to FIG. 2 which shows that the openings 3 are also suitable for connecting a plurality of carrier plates 1 together. As is generally conventional procedure nowadays in the manufacture of sheet metal roofs, the carrier plates 1 may have edge portions 7 which are bent out of the plane of the plate 1 so as to extend perpendicularly to the main body portion of the plate 1. The plates 1 are water-tightly connected together by the adjoining edge portions 7 of the pair of plates 1 being beaded or flanged over one or more times. Continuous or continuously moving tool arrangements may be used for this purpose. As shown in FIG. 2, the arrangement disclosed therein provides that one or more rows of the openings 3 as defined above can now be provided in the edge region 7 of at least one of the two plates to be joined together. The perpendicular edge regions 7 can be substantially shorter if required. The edge regions 7 are secured together by pressing them together by means of a continuous tool and, if required, by subsequent beading or flanging over. It will be appreciated that a wide range of connecting operations which are required in the production of a roof or a solar roof, can be carried out in the same or a similar manner to that shown in FIG. 2. This includes the production of gutter terminations, ridge fixings, side seals or closures, ducts or lead-through means for chimneys or vents, seals or closures on dormer windows or skylights and the like. The respective closure and connecting members then have one or more rows of the above-mentioned openings 3, at an appropriate position, or connecting members such as clips may be secured in place by means of the above-mentioned openings 3. This makes it possible to extensively eliminate expensive welding or soldering operations.

Figure 3:
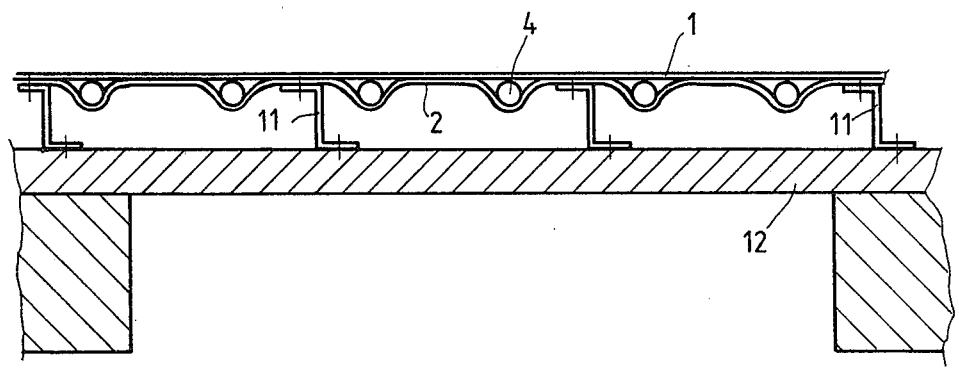
FIG. 3 shows a cross-sectional view of a solar roof structure.
Figure 4:
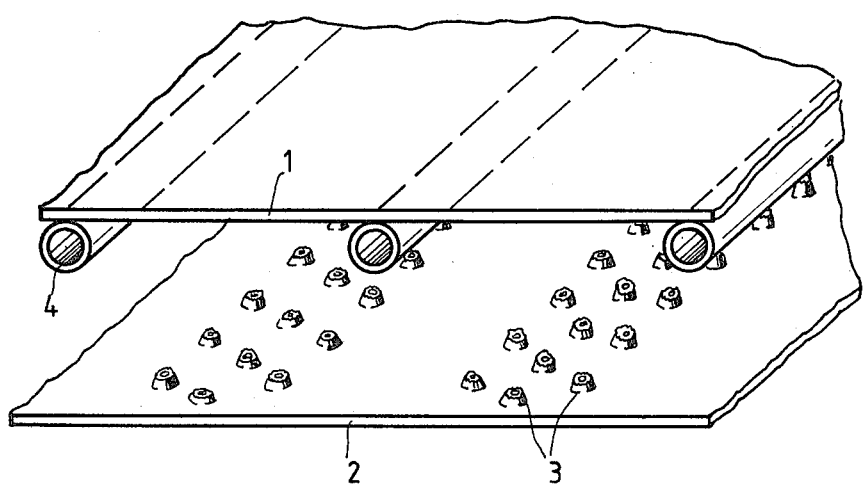
FIG. 4 shows an end view in section of a heat exchange assembly before the components thereof are finally connected together.

Reference is now made to FIG. 3 which shows that the curved portions or depressions 6 in the holding plate 2 can be omitted (see also FIG. 4 showing that the plate 2 may be flat prior to being pressed). It is even unnecessary for the holding plates 2 to be of the same width as the carrier plates 1. Therefore, the plates 2 may simply be strip members which are secured to the carrier plate 1 by means of openings 3, the purpose of the plates 2 then being primarily to hold the tube arrangement 4 in position and press it against the plate 1. The plate 2, of whatever form, may also have jagged-edge openings which are pressed out of the plate alternately in one direction and the other. In this way, shaped members 11, for example, as shown in FIG. 3, members of a generally Z-shaped, U-shaped or T-shaped configuration, may be simultaneously secured in a single pressing operation to the plate or plates 2. Shaped members 11 of this kind may be provided for supporting and securing the heat exchange members or assemblies, for example on a roof rafter or joist as indicated at 12.

Figure 5:
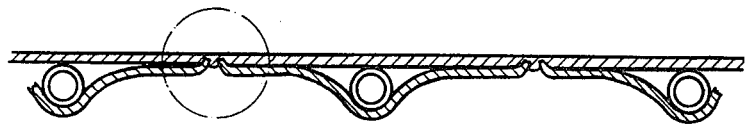
FIG. 5 shows a sectional view of part of a heat exchange assembly after the connection between the components thereof has been made.

FIG. 4 shows the components provided for making a heat exchange assembly, before they are pressed together, that is to say, before the plate 1 is connected to the plate 2 which in this embodiment is provided with the jagged-edge openings 3. FIG. 5 shows the heat exchange assembly in its finished form, that is to say, after the pressing operation, whereby the jagged edge portion 8 of the opening 3 has been caused to be embedded in the material of the plate 1, with consequent flow of the material thereof, as shown in FIG. 6 and as referred to hereinbefore.

Figure 7:
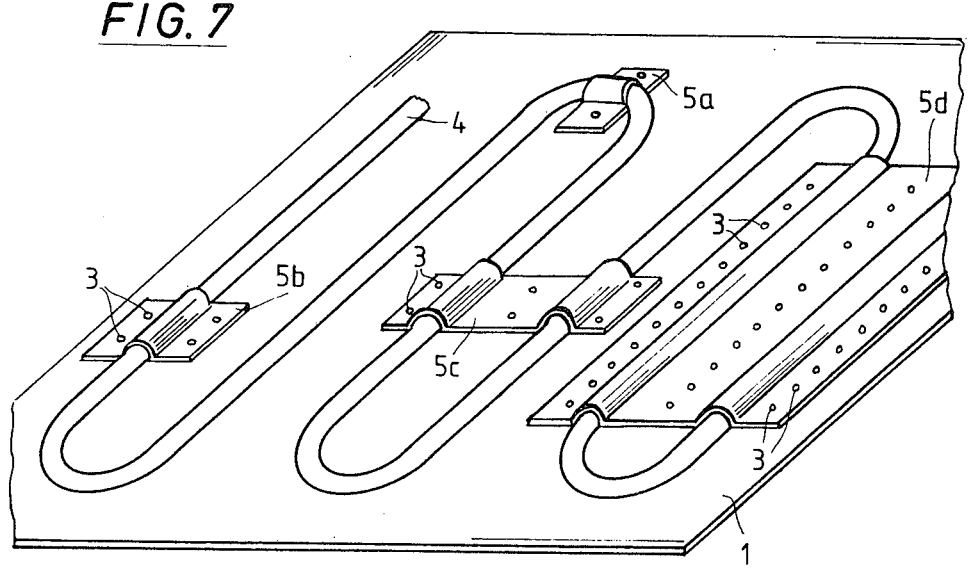
FIG. 7 shows a perspective view of a heat exchange assembly, showing different ways of connecting the components together.

FIG. 7 shows in diagrammatic form that, instead of the auxiliary holding plate or plates 2, it is possible to use various kinds of clips 5a to 5d with corresponding jagged-edge openings 3, with the clips 5a to 5d being of greater or smaller size, as required. The clips may be fitted over just a single run or limb of the pipe 4, or they may cover a plurality of such runs, as can be clearly seen from FIG. 7. FIG. 7 also shows that there are many possible variations in the structure of the invention, depending on the heat transfer required, the strength required, and also the specific construction involved.

The above-described method of connecting the components, in a cold condition, by means of the jagged-edge openings 3, therefore has the particular advantage that on the one hand, the cost of securing the pipe 4 to the carrier plate 1 is relatively low, but on the other hand, it is also possible to achieve a highly satisfactory heat transfer effect. There is therefore no need, to a very substantial extent, for expensive soldering or welding operations or other fixing methods.

Figure 9:
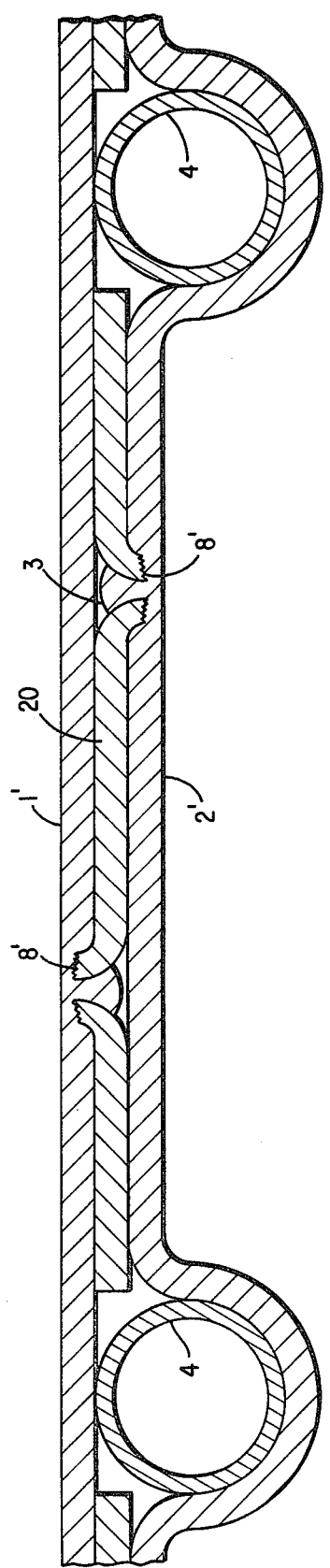
FIG. 9 shows another embodiment of part of a heat exchange assembly in accordance with the invention.

A particularly important consideration in this respect is that the above-described structure according to the invention makes it possible to solve corrosion problems which are an important factor specifically in the case of solar roofs. If, in the case of known roofs wherein it has not been possible to avoid soldering or welding, moisture manages to penetrate into the roof structure and such moisture is acid-enriched with for example sulphuric acid, as may happen in particular in large towns and cities and in industrial areas, then galvanic elements which result in corrosion are formed by virtue of the different levels of potential of the sheet metal plate 1, the soldering material, the material of the pipe arrangement, and the like. However, materials such as aluminium or aluminium alloys which are able to withstand such corrosion, while also being relatively inexpensive, are difficult to solder or braze. As the cold-connecting procedure as described hereinbefore only gives rise to minor problems, in respect of hardness, that is to say, the component which has the jagged-edge openings should be harder than the other components to be connected thereto, and as these problems can be solved by selecting a suitable material or alloy, the structure according to the invention provides the advantage that the limitations in respect of the material selected for use are substantially eliminated, while also avoiding problems from the point of view of corrosion. If materials of the same hardness, for example the plates 1 and 2, are to be connected together, it is preferable to use an insert strip 20, as illustrated in FIG. 9 which is harder than the metal of the plates 1' and 2' and which has jagged-edge openings as indicated at 3, with edge portions 8' pressed out of the strip alternately towards both sides thereof. Another suitable alternative for forming the connection shown in FIG. 2 is for a U-shaped strip member to be fitted in a hood-like manner over the upright edge portions of the carrier plates 1 (see FIG. 2); the strip member has jagged-edge openings which are pressed into the above-mentioned upright edge portions.

Figure 8:
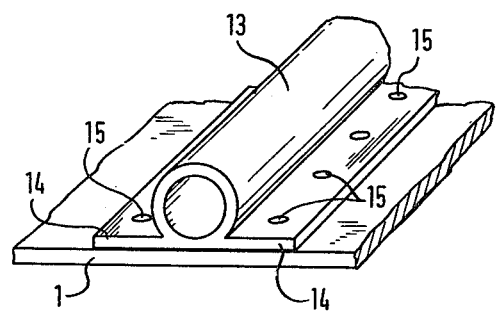
FIG. 8 shows another embodiment of part of a heat exchange assembly in accordance with the invention.

Finally, reference should be made to FIG. 8 which shows a construction wherein the pipe 13 is provided with at least one laterally projecting portion 14, there being two such portions 14 as illustrated, on respective sides of the pipe. Each portion 14 has at least one opening 15, of the kind described above, with jagged or frayed edges, for securing the pipe to the carrier plate 1. The pipe 13 and portion or portions 14 are preferably integrally formed as by extrusion, and the or each portion 14 may extend over the entire length of the pipe 13, although the or each portion may extend over only a part of the pipe length; in particular, the portion 14 may be removed as by cutting away, at locations where the pipe 13 may be required to bend on its run on the carrier plate 1. It will be appreciated that in the FIG. 8 structure, the surface of the pipe 13—portion 14 assembly, which is towards the adjacent surface of the plate 1 is at least substantially flat in order to provide good contact with the plate 1 for satisfactory heat-exchange therewith.

In a modified form of the FIG. 8 embodiment, the openings 15 may be provided in the carrier plate 1 instead of the portions 14 as illustrated, the relative hardnesses of the interconnected components being suitably adjusted to give a good securing action.

Various modifications may be made in the above-described embodiments of the invention without thereby departing from the spirit and scope thereof.

I claim:

1. A heat exchange assembly comprising a metal carrier member, a pipe means carried by the metal carrier member for carrying a heat exchange medium, and metallic means for securing the pipe means to the carrier member, wherein at least one of the carrier member and the securing means has openings therethrough, the edge portion of each said opening being of a jagged configuration and projecting from the adjacent surface of the surrounding material, the edge portion of each said opening being pressed into the other of said carrier member and the securing means of the assembly and the material of said other of said carrier member and the securing means engaging into the openings thereby to form an anchoring means substantially of rivet head-like configuration.

2. A heat exchange assembly as set forth in claim 1 wherein said pipe means comprises a plurality of portions extending generally parallel to each other, wherein said openings are arranged in at least one row between two such pipe portions.

3. A heat exchange assembly as set forth in claim 1 wherein said carrier member is shaped to form portions embracing around the pipe means.

4. A heat exchange assembly as set forth in claim 1 wherein said securing means is shaped to form portions embracing around the pipe means.

5. A heat exchange assembly as set forth in claim 1 wherein said securing means comprises at least one holding plate.

6. A heat exchange assembly as set forth in claim 1 wherein said securing means comprises at least one clip member.

7. A heat exchange assembly as set forth in claim 1 wherein said securing means comprises at least one laterally projecting portion on said pipe means.

8. A heat exchange assembly as set forth in claim 7 wherein said pipe means and said at least one projection portion are formed integrally with each other in the form of an extrusion.

9. A heat exchange assembly as set forth in claim 1 wherein said carrier member is a plate member having a bent edge portion forming a connecting flange configuration which has a multiplicity of said openings thereby being adapted to secure said carrier plate member to at least one other adjacent carrier plate member.

10. A heat exchange assembly as set forth in claim 1 wherein said one of the carrier member and the securing means provided with said openings is harder than said other of the carrier member and the securing means adapted to be connected thereto.

11. A heat exchange assembly as set forth in claim 1 wherein at least one of said carrier member and said securing means comprises a material selected from aluminium, aluminium alloy, copper and copper alloy.

12. A heat exchange arrangement comprising a heat exchange assembly as set forth in claim 1 and further comprising support means adapted to support and mount said heat exchange assembly, said support means being secured to said heat exchange assembly by means of an arrangement of said openings.

13. A heat exchange assembly as set forth in claim 1, wherein the other of said carrier member and the securing means is formed from a material selected from aluminum, aluminum alloy, copper and copper alloy, said one of the carrier member and the securing means provided with said openings being formed of a harder material.

14. In a heat exchange assembly comprising a metal carrier means, a pipe means for carrying a heat exchange medium, the pipe means being supported by the carrier means, and metallic holding means for holding said pipe means to said carrier means, the improvement that comprises connecting the carrier means and the holding means together by a configuration comprising a plurality of openings in at least one of said carrier means and said holding means of the assembly, each said opening having an edge portion of jagged configuration projecting substantially normal to the adjacent surface of the component in which said openings are formed, the jagged edges of the openings being at least partially embedded in the material of at least one other of said carrier means and said holding means and material of said at least one other of said carrier means and said holding means being engaged in said openings in a rivet head-like anchoring configuration.

15. An assembly as set forth in claim 14 wherein said openings are provided in the carrier means.

16. An assembly as set forth in claim 14 wherein said openings are provided in the holding means.

17. An assembly as set forth in claim 14 wherein said holding means includes a portion integral with said pipe means and projecting laterally therefrom over at least a part of the length of said pipe means.

18. An assembly as set forth in claim 14 which includes an insert strip disposed between the carrier means and the holding means, the insert strip, carrier means and holding means being connected together by respective arrangements of said openings.

19. An assembly as set forth in claim 14, wherein the other of said carrier means and said holding means is formed from a material selected from aluminum, aluminum alloy, copper and copper alloy, said one of the carrier means and the holding means provided with said openings being formed of a harder material.

20. In a heat exchange assembly comprising a metallic carrier means; a pipe means for carrying a heat exchange medium; a metal auxiliary holding plate, the pipe means being supported between the carrier means and the auxiliary holding plate; and metallic holding means for holding said auxiliary holding plate to said carrier means, said holding means comprising an insert strip formed from a material harder than the materials forming the carrier means and auxiliary holding plate, said insert strip having jagged-edge openings pressed out of alternate sides thereof, each said opening having an edge portion of jagged configuration projecting substantially normal to the adjacent surface of the insert strip, the jagged edges of the openings being at least partially embedded in the materials of the carrier means and auxiliary holding plate, said materials being engaged in said openings in a rivet head-like anchoring configuration to thereby secure said carrier means and auxiliary holding plate to said insert strip.

* * * * *